Oct. 12, 1965  H. F. EDWARDS  3,212,077
LIQUID QUANTITY GAUGE
Filed Aug. 21, 1962
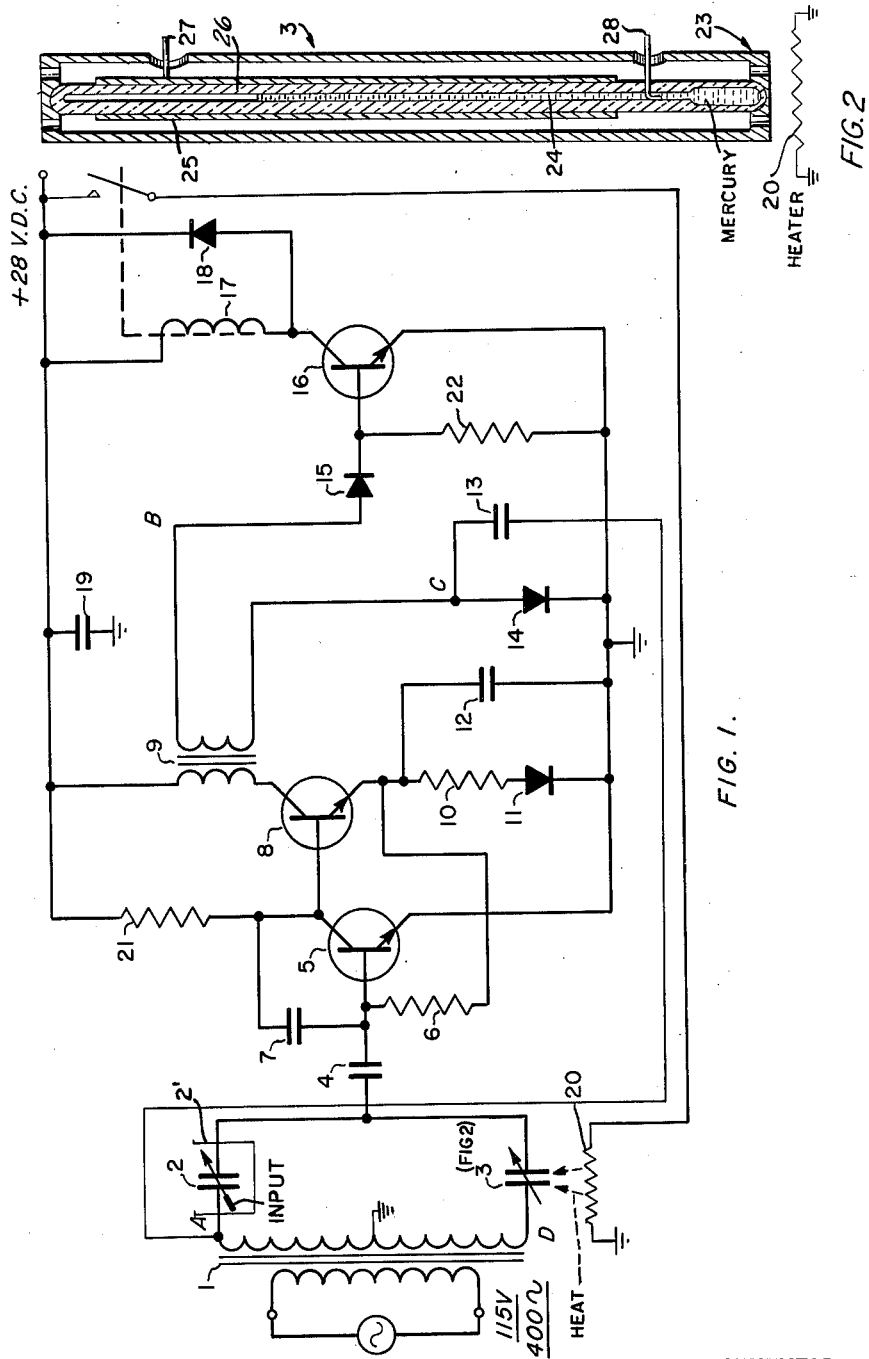
INVENTOR.
HARRISON F. EDWARDS
BY
Edwin E. Grigg

United States Patent Office 3,212,077
Patented Oct. 12, 1965

3,212,077
LIQUID QUANTITY GAUGE
Harrison F. Edwards, Ferrisburg, Vt., assignor to Simmonds Precision Products, Inc., Tarrytown, N.Y., a corporation of New York
Filed Aug. 21, 1962, Ser. No. 219,099
4 Claims. (Cl. 340—200)

This invention relates to a control circuit for indicating the value of a characteristic of a stored medium, and more particularly relates to a circuit for indicating the quantity of liquid in an aircraft tank or other liquid container.

The invention is of particular utility in aircraft where a reliable and accurate indication is required of the quantity of fuel in the fuel tanks.

It is an object of this invention to provide a novel closed-loop control circuit for indicating the quantity of fuel in an aircraft fuel tank at a position remote from the said tank, for example, on the instrument panel of the aircraft.

It is another object of this invention to provide a novel closed-loop control circuit for indicating the quantity of liquid in a container, which circuit includes a capacitance bridge.

It is another object of this invention to provide a novel closed-loop control circuit for indicating the quantity of liquid in a tank, which circuit includes a capacitance re-balancing bridge having at least two arms, in one arm of which there is located a variable capacitor the value of which varies in dependence on the quantity of liquid in the tank, and in the other arm of which there is located a thermally-variable capacitor which provides an indication of said quantity and which is varied by thermal means operative when the capacitance bridge is unbalanced.

It is another object of this invention to provide a novel closed-loop control system for indicating the quantity of fuel in a fuel tank which circuit includes a capacitance bridge having one capacitor the value of which varies in dependence on the quantity of fuel in the tank and another capacitor which is thermally variable and which provides a visual indication of the said value, and including phase-sensitive circuit means operable when the bridge is unbalanced to control thermal means to vary the said thermally-variable capacitor in a manner such as to re-balance the said bridge.

For a better understanding of this invention as well as other objects and further features thereof reference is had for the following description to be read in conjunction with the accompanying drawing which is numeral referenced throughout.

FIGURE 1 illustrates a schematic diagram of a basic closed-loop control circuit for indicating the quantity of liquid in a fuel tank or other liquid container.

FIG. 2 is an elevational view of the variable temperature capacitor utilized in accordance with the principles of the present invention.

Referring now to FIGURE 1 there is illustrated an input transformer the secondary winding of which is grounded at a center tap and is connected in a capacitance bridge circuit. An amplifier is provided to amplify any unbalance current from this bridge and energise a relay in dependence thereon, which results in the operation of control means for re-balancing the bridge.

When the bridge is balanced there is no output from the amplifier and the relay remains de-energised.

Referring now more particularly to FIGURE 1 an input transformer 1 has its primary winding connected across an alternating voltage source providing 115 volts at 400 cycles/sec. The secondary winding of the transformer has two variable capacitors 2 and 3 connected thereacross the junction between these capacitors being connected through a capacitor 4 to the input (base) of a transistor amplifier 5. The collector circuit of this transistor includes a load resistor 6 and a capacitor 7 couples the collector-base circuits.

The output of the transistor amplifier 5 is connected to the input of a further transistor amplifier 8 in the output circuit of which there is provided a transformer 9.

The transistor amplifier 5 is provided with a bias voltage through a resistor 6, which voltage is in turn derived from an emitter bias circuit of the transistor 8 constituted by a series-connected resistor 10 and rectifier 11 across which is connected a capacitor 12.

One end of the output winding of the transformer 9 is connected to a phase-sensitive gate consisting of a capacitor 13 and a rectifier 14 and the other end is connected through a rectifier 15 to a further transistor amplifier 16. The control winding of a relay 17 is connected to the output circuit of the amplifier 16 and when an output is produced by this amplifier the said winding is energised and closes a contact 17. A rectifier 18 is connected across the control winding in order to prevent irregular operation of the contact 17 upon de-energisation of this winding and a capacitor 19, in series with resistor 21, serves to decouple the transistor stages.

Closure of the contact 17 causes current from a 28 volt D.C. supply to flow through a heater winding 20 which, being adjacent capacitor 3, controls the capacitance of the variable capacitor 3 in the balancing bridge circuit.

The variable capacitor 2 may be situated in the fuel tank 2' of, for example, an aircraft, the capacitance thereof varying in dependence on the quantity of fuel in the tank 2'. In this connection, it is well known that the capacitance of a capacitor is dependent on three qualities, namely, the area of the plates, the distance between the plates, and the dielectric constant of the material between the plates. In a fuel-tank capacitor of this type the plate area and the distance between the plates is fixed and the only quantity which can vary is the dielectric constant of the said material. In this instance the material is partially fuel and partially air, and since the proportion of fuel to air varies in accordance with the quantity of fuel in the tank then the capacitance of the capacitor 2 will be directly dependent upon this quantity.

The variable capacitor 3 may be of the temperature-variable type disclosed in patent application Serial No. 53,451, filed September 1, 1960, now U.S. Patent 3,190,-122, and assigned to the assignees of the present application. This capacitor may be situated on the instrument panel of the aircraft and the temperature responsive medium, e.g., mercury, may give a direct visual indication of the quantity of fuel in the tank. As shown in FIG. 2, a metal body 23 partially surrounds a bulb-type thermometer 26 having its bulbous end portions positioned in diametrically opposed recesses provided in the interior of the body 23. This thermometer contains a conventional mercury column 24 in the axial center thereof which is responsive to variations in temperature in the usual manner. A conductive sheath 25 in the form of Conductite paint encompasses substantially the outer periphery of the thermometer and extends over substantially the entire length thereof. While silver paint is the Conductite preferred, other suitable equivalent substitutions will appear obvious to those conversant with the art. Suitable electrical contacts 27 and 28 are provided for the device. Contact 27 is suitably connected with the sheath-like electrode 25. The contact 28 is positioned in the wall of thermometer 26 with a depending end thereof projected downwardly into the mercury column 24. Each of the contact leads 27 and 28 extends through apertures provided in the metallic body 23, as shown. It will now be apparent to those skilled in the art that the mercury column 24 and conductive sheath 25 thus form the plates of a variable capacitor as the temperature varies. Expansion and contraction of the mercury column within the thermometer 26, due to temperature differentials, result in a corresponding change in the capacitance of the unit. This is due to the fact that the capacitance will change substantially in direct proportion to the height of the mercury column within the thermometer. For this purpose it is advantageous for the mercury "column" to be circular in shape. Special lighting means may be employed to enable the mercury column to be read easily through a suitable open area in the metal body 23.

The operation of the circuit is described below.

Initially, it will be assumed that there is a difference in the capacitative values of the two variable capacitors 2 and 3. The capacitance bridge circuit will thus be unbalanced and a reactive current proportional to the said difference will be applied through the capacitor 4 and amplified, firstly by the transistor 5 and thence by the transistor 8.

The secondary winding of the transformer 9 in the output circuit of the transistor 8 has one end connected to the phase-sensitive gate, the capacitor 13 in which is connected to a terminal A in the transformer 1 and permits a current in phase with that at the said terminal to flow through the rectifier 14 during each half-cycle of this current, i.e., the positive half-cycle. Thus, when the reactive current amplified by the two transistor amplifiers 5 and 8 is such that a positive-going signal is present at the points B on the secondary winding of the transformer 9 and C (in the phase-sensitive gate), forward current will flow in the base-emitter circuit of transistor amplifier 16 which is thereby rendered conductive and the control winding of relay 17 will be energised and close its contact 17.

Conversely, when the reactive current amplified by the two transistor amplifiers 5 and 8 is such that the point B is negative-going whilst the point C is positive-going then current will not flow in the base-emitter circuit transistor 16 will remain non-conductive and the relay will remain de-energised with its contact 17 open.

It follows then, that the relay is energised only if the product of the potential at the terminal A and the capacitance of the capacitor 2 exceeds the product of the potential at terminal D and the capacitance of the capacitor 3.

Thus, if the arrangement is such that the relay contact 17 is closed when the mercury column in the variable capacitor 3 indicates an erroneous low value for the quantity of fuel, then the heater winding 20 is energised and heats the mercury column 24 thereby changing its length and the capacitance of the capacitor 3 is varied in a sense to reduce the error in the indicated value. As the capacitance of 3 approaches the value of capacitance of 2 the relay is de-energised and its contact 17 opens and breaks the circuit for the heater winding 20.

The temperature-responsive variable capacitor 3 should preferably be designed so that the whole capacitative range over which it may be adjusted is covered by changes in temperature of from 80° C. to 120° C. The lower limit of 80° C. is necessary to enable the circuit to operate satisfactorily in high ambient temperatures. It is possible, however, to arrange for a thermo-electric cooling device to be operative on the capacitor 3 when the relay is de-energised in order to permit a reduction in the above mentioned lower limit of temperature.

Alternatively, the thermo-electric cooling device may replace the heater and operate the capacitor 3 when the relay is either energised or de-energised.

Although there has been shown what is considered to be the preferred embodiment of the invention, it will be manifest that many changes and modifications may be made therein without departing from the essential spirit of the invention. It is intended, therefore, in the annexed claims to cover all such changes and modifications as fall within the true scope of the invention.

What I claim is:

1. A closed-loop control circuit for indication of the value of a characteristic of a stored medium comprising, a characteristic-variable capacitor, the capacitance of said characteristic-variable capacitor varying in correspondence with variations in the value of said characteristic, a thermally-variable capacitor, said thermally-variable capacitor having electrically energized thermal means for varying the capacitance of said thermally-variable capacitor, said thermally-variable capacitor further having index means movable in correspondence with variations in the capacitance of said thermally-variable capacitor for indicating said value, a source of electrical potential, said potential source being electrically connected with said characteristic-variable capacitor in a first circuit and said thermally-variable capacitor in a second circuit to form a balancing network, said network having an output, the potential at said output increasing with increase in the difference between the capacitance of said thermally-variable capacitor and the capacitance of said characteristic-variable capacitor, and an electrical amplifier, said amplifier having an input and output, said amplifier input being electrically connected to the output of said balancing network, said amplifier output being electrically connected to said electrically energized thermal means, the amplifier output from said network energizing said thermal means to vary the capacitance of said thermally-variable capacitor in a sense which reduces the difference between the capacitance of said characteristic-variable capacitor and the capacitance of said thermally-variable capacitor.

2. In a liquid gauge system for gauging liquid in a container, a thermally-variable capacitor having liquid gauge index means movable in correspondence with variations in the capacitance of said capacitor, a gauging capacitor whose capacitance is varied by the liquid in dependence upon the quantity thereof, a source of electrical potential, said thermally-variable capacitor and said gauging capacitor being electrically connected with said source of electrical potential to form a balancing network for providing an electrical output which varies in dependence upon the difference between the capacitance of said thermally-variable capacitor and the capacitance of said gauging capacitor, and an electrical amplifier having an input and an output, the input of said amplifier being electrically connected to said network for amplification of said electrical output, the output of said amplifier being electrically connected to said thermally-variable capacitor for thermally varying the capacitance of said thermally-variable capacitor in a sense to reduce any difference between the capacitance of said thermally-variable capacitor and the capacitance of said gauging capacitor and to move said liquid gauge index means to correspond to the liquid gauged by said gauging capacitor.

3. In a fuel gauge system for indicating the quantity of fuel in a fuel tank, a first variable capacitor located in said fuel tank, the capacitance of the capacitor varying in dependence on the variations of the quantity of fuel in the said tank, a second variable capacitor located remote from said tank, the capacitance of the second capacitor being varied in dependence on the length of a thermally-controlled mercury column, a balancing network having at least one output, said network comprising said first and second variable capacitors, an alternating potential source for said balancing network for supplying an electrical signal at said output in response to a difference in the capacitances of said first and second variable capacitors, and switching means connected to said output responsive to the presence of said signal for controlling a thermal means to vary the length of said mercury column in the said second capacitor to reduce towards zero the capacitative difference between the first and second capacitors.

4. A liquid gauge system as claimed in claim 3, wherein the switching means is an electromagnetic relay having a pair of contacts which when closed complete a circuit for energizing said thermal means.

References Cited by the Examiner
UNITED STATES PATENTS

| | | | |
|---|---|---|---|
| 2,056,285 | 10/36 | Machlet | 340—186 |
| 2,656,507 | 10/53 | Fiellden | 340—200 |

NEIL C. READ, *Primary Examiner.*

THOMAS B. HABECKER, *Examiner.*